J. W. STEPHENSON.
FASTENING FOR RAIL JOINTS AND THE LIKE.
APPLICATION FILED JULY 28, 1911.
1,031,966.
Patented July 9, 1912.
2 SHEETS—SHEET 1.
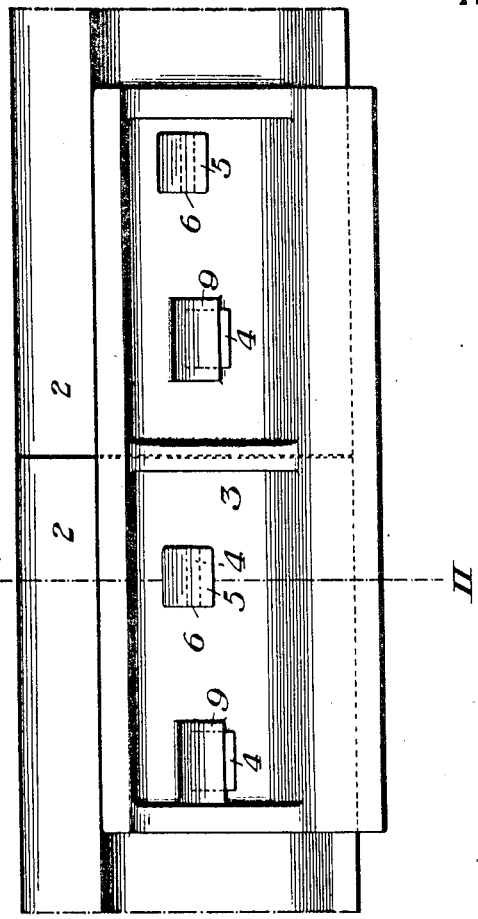
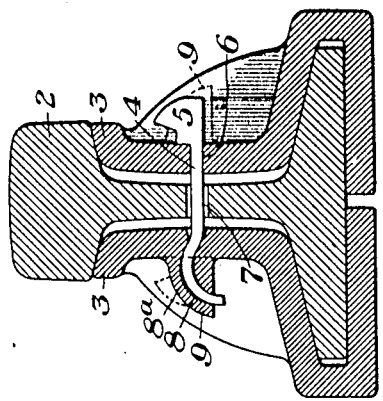
WITNESSES
INVENTOR J. W. STEPHENSON.
FASTENING FOR RAIL JOINTS AND THE LIKE.
APPLICATION FILED JULY 28, 1911.
1,031,966.
Patented July 9, 1912.
2 SHEETS—SHEET 2.
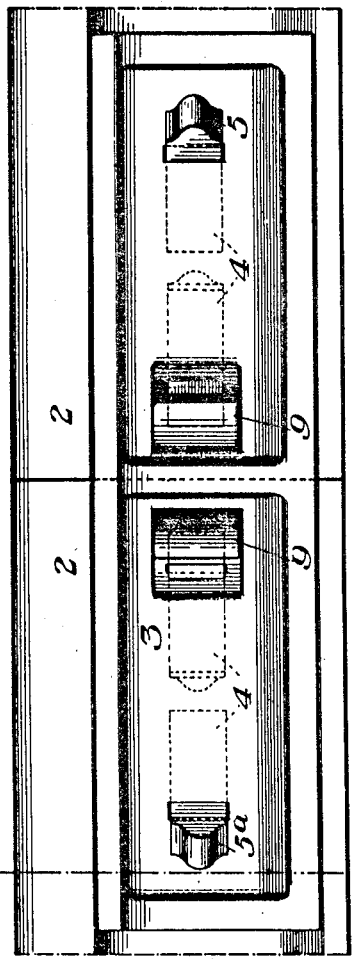
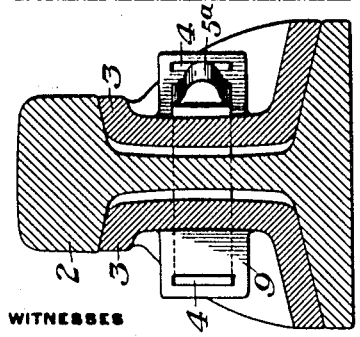
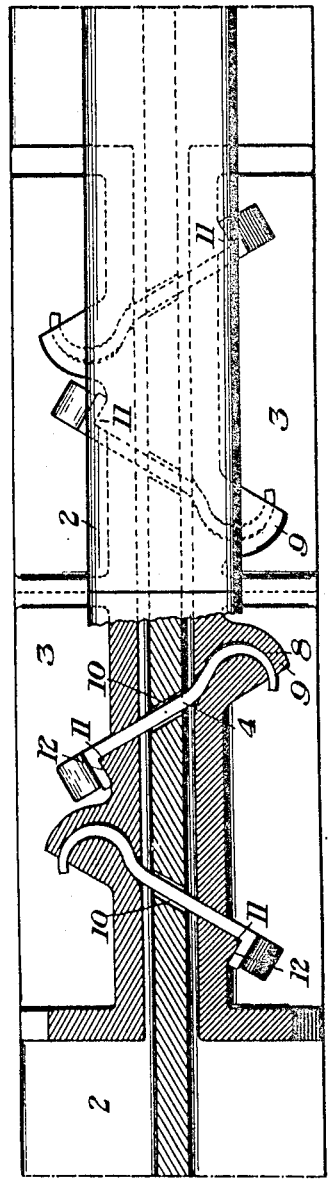
WITNESSES
INVENTOR

UNITED STATES PATENT OFFICE.

JOHN W. STEPHENSON, OF TOLEDO, OHIO, ASSIGNOR TO THE NATIONAL MALLEABLE CASTINGS COMPANY, OF CLEVELAND, OHIO, A CORPORATION OF OHIO.

FASTENING FOR RAIL-JOINTS AND THE LIKE.

1,031,966. Specification of Letters Patent. Patented July 9, 1912.

Application filed July 28, 1911. Serial No. 641,141.

*To all whom it may concern:*

Be it known that I, JOHN W. STEPHENSON, a citizen of the United States, and a resident of Toledo, Lucas county, Ohio, have invented a new and useful Improvement in Fastenings for Rail-Joints and the Like, of which the following is a full, clear, and exact description, reference being had to the accompanying drawings, forming part of this specification, in which—

Figure 1 is a side view of a rail joint embodying one form of my invention; Fig. 2 is a section on the line II—II of Fig. 1; Fig. 3 is a side view showing a modification;
Fig. 4 is a section on the line IV—IV of Fig. 3; and Fig. 5 is a view partially in plan and partially in horizontal section of the modified rail joint of Figs. 3 and 4.

My invention has relation to fastenings for rail joints and the like, and is designed to provide a simple and efficient fastening which can be readily and quickly applied; which will obviate the use of the bolts commonly employed, together with the difficulty of locking and securing the nuts against looseness; and which is of such a character that it can be applied by an ordinary unskilled track laborer.

With these objects in view, my invention consists in the provision of a fastening for the joint plates of a rail joint, which can be driven through the joint plates and the web of a rail, and which, by the operation of driving it, will securely lock itself in position.

My invention will be best understood by reference to the accompanying drawings, in which I have illustrated two different embodiments thereof, and which will now be described, it being premised, however, that the invention is susceptible of various other embodiments, and that the details thereof may be changed in various ways without departing from the spirit and scope of my invention as defined in the appended claims.

Referring first to the form of my invention shown in Figs. 1 and 2, the numeral 2 designates the adjacent end portions of two track rails, and 3 the fish or joint plates.
These fish or joint plates may be of any usual or suitable character, either extending underneath the rail base, as shown in Figs. 1 and 2, or terminating above the rail base, as shown in Figs. 3, 4 and 5. These plates are shown as secured to each other and to the rails by means of the plurality of bendable key members 4. Each of these key members has an enlarged driving head 5, by means of which it may be driven through an opening 6 in one of the fish plates, through an opening 7 in the web of the rail, and into a deflecting passage or opening 8 formed in the opposite plate. In the form of fish plate shown in the drawings, the curved bending or deflecting openings or passages 8 are formed in lugs 9 projecting laterally from the outer face of the plate. As the keys, which are of malleable metal, are driven through these openings and into the passageways 8, their end portions will be bent or deflected by the curved walls of said passageway in the manner clearly shown in the drawings, thereby forming a secure clench fastening. Preferably the passageways 8 are formed with slight clearance spaces, as shown at 8ª. Although not essential to my invention, I prefer to drive successive keys in opposite directions, as shown. Any desired number of keys may be employed at each joint, according to the length of the joint.

In the modification shown in Figs. 3, 4 and 5, the fastening is substantially the same as that first described, except that instead of driving the keys straight through the joint plates and web of the rail, they are driven obliquely and the openings 10 through the webs of the rails are oblique. In this form it may be desirable to provide the joint plates with projections 11 to receive the shoulders 12 at the inner sides of the heads of the keys. The keys may, as shown in Figs. 3 and 5, be driven not only alternately from the reverse sides, but may be driven at reverse angles.

My invention provides an extremely simple and efficient fastening for rail joint plates. All that is required is to put the joint plates in position, and drive the keys therethrough. The act of driving effects a fastening in such a manner that they cannot subsequently work loose. The use of fastenings of this character obviates the employment of the usual bolts and nuts and the difficulty of preventing the nuts from working loose in service under the vibrations to which they are subjected.

I do not limit myself to the particular forms of bendable key which I have herein shown and described, since they may vary in form. The curved deflecting passageways may also be made in different forms.

My invention is not only applicable to rail joints, but to other rail-engaging members placed at opposite sides of the web of the rail, and which it may be desired to secure by fastenings extending through the web of the rail.

What I claim is:—

1. In railway track construction, the combination with rail-engaging members at opposite sides of the web of the rail, of a key member driven through the rail-engaging members and the web of the rail, and means carried by one of said members for bending or deflecting a portion of the key to thereby lock it; substantially as described.

2. In a rail joint, the combination with joint members at opposite sides of the rails, of a plurality of key members driven through the joint members and webs of the rails, and having bent or deflected locking portions and one of said members having deflecting means for forming said bent or deflected portions as the key members are driven; substantially as described.

3. In a rail joint, the combination with joint members at opposite sides of the rails, of a plurality of key members driven through the joint members and webs of the rails, and having bent or deflected locking portions, said keys being driven from opposite sides of the rails and one of said members having deflecting means for forming bent or deflected portions on the key members as they are driven from the opposite side of the rail; substantially as described.

4. As a new article of manufacture, a rail joint plate provided with a projection on its outer face, and said projection having an opening therein extending through to the inner face of the plate, said opening having a curved deflecting wall; substantially as described.

5. In a rail joint, a rail-engaging member having a lateral lug or projection on its outer face, and a curved key-deflecting opening or passageway extending therethrough and through said lug; substantially as described.

In testimony whereof, I have hereunto set my hand.

JOHN W. STEPHENSON.

Witnesses:
J. J. MANNING,
MARK KUEHN.

---

Copies of this patent may be obtained for five cents each, by addressing the "Commissioner of Patents, Washington, D. C."